United States Patent
Pulleyn et al.

(10) Patent No.: US 9,065,851 B2
(45) Date of Patent: *Jun. 23, 2015

(54) SYSTEMS AND METHODS FOR STORING AND RETRIEVING DATA

(75) Inventors: Ivan W. Pulleyn, Sunnyvale, CA (US); Stuart Bailey, Mountain View, CA (US)

(73) Assignee: Infoblox Inc., Santa Clara, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 12/986,086

(22) Filed: Jan. 6, 2011

(65) Prior Publication Data

US 2011/0167090 A1 Jul. 7, 2011

Related U.S. Application Data

(63) Continuation of application No. 11/404,375, filed on Apr. 13, 2006, now Pat. No. 7,889,676.

(51) Int. Cl.
*G06F 7/00* (2006.01)
*G06F 17/30* (2006.01)
*H04L 29/12* (2006.01)

(52) U.S. Cl.
CPC ...... *H04L 61/1511* (2013.01); *G06F 17/30958* (2013.01); *H04L 29/12066* (2013.01); *H04L 29/12132* (2013.01); *H04L 61/1552* (2013.01)

(58) Field of Classification Search
CPC .............. G06F 17/30864; G06F 17/30958; G06F 17/30861; G06F 9/46; G06F 15/177; G06F 9/5038; H04L 12/56; H04L 45/00; H04L 45/742; H04L 45/60
USPC ................... 707/802, 999.105, 959
See application file for complete search history.

(56) References Cited

U.S. PATENT DOCUMENTS

| | | | |
|---|---|---|---|
| 5,493,607 A * | 2/1996 | Arumainayagam et al. | 379/88.18 |
| 5,717,921 A * | 2/1998 | Lomet et al. | 1/1 |
| 5,864,738 A * | 1/1999 | Kessler et al. | 709/239 |
| 5,912,753 A * | 6/1999 | Cotter et al. | 398/54 |
| 6,151,624 A * | 11/2000 | Teare et al. | 709/217 |
| 6,223,172 B1 * | 4/2001 | Hunter et al. | 707/741 |
| 6,249,806 B1 * | 6/2001 | Kohda et al. | 709/206 |
| 6,381,628 B1 * | 4/2002 | Hunt | 709/201 |
| 6,446,094 B1 * | 9/2002 | Egolf et al. | 1/1 |
| 6,484,160 B1 * | 11/2002 | Richard et al. | 1/1 |
| 6,735,679 B1 * | 5/2004 | Herbst et al. | 711/167 |
| 6,883,028 B1 * | 4/2005 | Johnson et al. | 709/226 |
| 7,302,484 B1 * | 11/2007 | Stapp et al. | 709/226 |
| 7,325,059 B2 * | 1/2008 | Barach et al. | 709/225 |
| 7,519,764 B2 * | 4/2009 | Kim et al. | 711/103 |
| 7,539,105 B2 * | 5/2009 | Chen et al. | 369/53.2 |
| 7,561,589 B2 * | 7/2009 | Shoham et al. | 370/412 |
| 7,596,669 B2 * | 9/2009 | Herbst | 711/163 |
| 7,603,664 B2 * | 10/2009 | Dutt et al. | 717/153 |
| 7,623,547 B2 * | 11/2009 | Dooley et al. | 370/466 |
| 2002/0116526 A1 * | 8/2002 | Brown | 709/245 |
| 2004/0068521 A1 * | 4/2004 | Haacke et al. | 707/200 |
| 2005/0041596 A1 * | 2/2005 | Yokomitsu et al. | 370/252 |
| 2005/0138161 A1 * | 6/2005 | McDaniel et al. | 709/223 |
| 2010/0161537 A1 * | 6/2010 | Liu et al. | 706/46 |
| 2011/0082931 A1 * | 4/2011 | Wang et al. | 709/224 |

* cited by examiner

*Primary Examiner* — Daniel Kuddus
(74) *Attorney, Agent, or Firm* — Van Pelt, Yi & James LLP

(57) ABSTRACT

Storing data is disclosed. A range or addresses is received and the range of addresses is stored in a bulk object. Retrieving data is disclosed. A request to access data associated with an address within a range of addresses is received. A response is derived based at least in part on a bulk object.

7 Claims, 13 Drawing Sheets

SYSTEMS AND METHODS FOR STORING AND RETRIEVING DATA

CROSS REFERENCE TO OTHER APPLICATIONS

This application is a continuation of co-pending U.S. patent application Ser. No. 11/404,375, entitled SYSTEMS AND METHODS FOR STORING AND RETRIEVING DATA filed Apr. 13, 2006 which is incorporated herein by reference for all purposes.

BACKGROUND OF THE INVENTION

The Domain Name System (DNS) stores information associated with domain names in a database on networks, such as the Internet. DNS may associate many types of information with domain names. For example, DNS provides an IP address associated with a domain name. DNS also lists mail exchange servers accepting email for each domain. When configuring a DNS server, it may be necessary to load a bulk set of data (for example, 400 class B IP addresses) associated with a given range of IP addresses. In addition, within the range, it may be desirable to override data associated with certain IP addresses. Typical DNS servers cannot handle inserting such a large set of data. Thus, it would be desirable to have a method of handling data associated with a range of addresses, including overriding data associated with particular addresses within the range.

SUMMARY OF THE INVENTION

Systems and methods for storing and retrieving data are provided. In some embodiments, a method of storing data includes receiving a first network address, receiving a range of network addresses, wherein the range of network addresses is associated with Domain Name System (DNS), storing using a processor the range of network addresses as a bulk object in a database for storing information associated with the range of network addresses, and storing using the processor the first network address as a host record in the database. The bulk object is a bulk record associated with multiple hosts in a range of network addresses, and an index is used to access objects stored in the database. Storing includes inserting an edge associated with a begin address of the range of network addresses into the index, the edge including a begin marker for the range of network addresses and a reference to the bulk object, inserting an edge associated with an end address of the range of network addresses into the index, the edge including an end marker for the range of network addresses and a reference to the bulk object, and inserting an edge associated with the first network address into the index, the edge including an address marker and a split marker, wherein the address marker is a reference to the host record, and wherein the split marker is a reference to the bulk object.

The range of network addresses may include range of Internet Protocol (IP) addresses.

The bulk object may be a reverse zone record.

The bulk object may be associated with a constraint.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
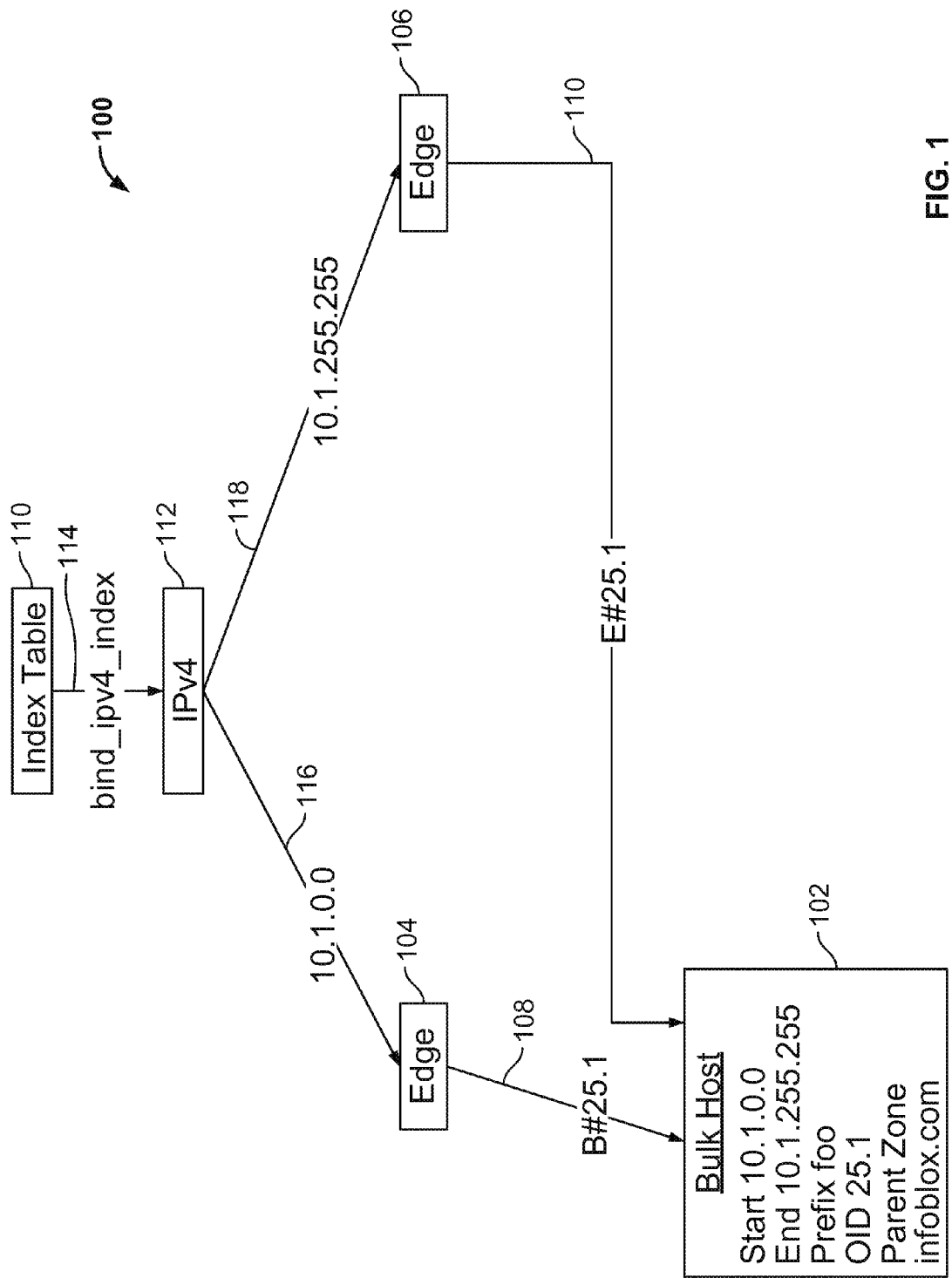
FIG. 1 is a diagram illustrating the insertion of a bulk host into an index.

FIG. 1 is a diagram illustrating the insertion of a bulk host into an index. In this example, an index is a structure used to access records (or objects) in a DNS server. As used herein, the terms "record" and "object" may be used interchangeably. An index can be efficiently searched to return a list of objects matching or overlapping with a given address. Although a server may be described herein, any other appropriate system may be used in place of a server, such as an appliance. Similarly, although DNS and IP addresses may be described herein, any other appropriate system, such as Dynamic Host Configuration Protocol (DHCP), associated with addresses or other data may be used.

In DNS, a pointer (PTR) record implements a reverse DNS lookup for an IP address. In other words, a PTR record maps an IP address to a name for a host. In some embodiments, a DNS server maintains a set of internal records and a set of external records. When a query is received, an external record is derived from one or more internal records and the external record is returned. For example, internal records may include PTR records, host address records, and bulk host records. From a bulk host record, a PTR record may be derived and returned, as more fully described below. In some embodiments, the records are a heap of unmanaged objects.

Index 100 is shown to include various objects, including index root 110 (Index Table), which includes reference 114 (bind_ipv4_index) to index 112 (IPv4). Index 112 includes reference 116 (10.1.0.0) to edge 104 and reference 118 (10.1.255.255) to edge 106. An edge or edge object stores references to ranges that overlap with (match) its corresponding address.

In this example, bulk host 102 is inserted into index 100. A bulk host (or bulk host record or bulk host object) is a record associated with multiple hosts in a range of IP addresses. The range may include a contiguous set of addresses bounded by an inclusive begin and end address. As used herein, "begin" and "start" may be used interchangeably. Bulk host 102 is associated with a range of IP addresses from 10.1.0.0 to 10.1.255.255. Bulk host 102 includes a prefix "foo" that may be used to generate a host name for each IP address. For example, the prefix may be a string that is appended to a host name. Bulk host 102 has an object identifier (OID) of 25.1. In some embodiments, an object identifier is a number that uniquely identifies a record (or object). Bulk host 102 has a parent zone of "infoblox.com". Thus, bulk host 102 represents a range of hosts with IP addresses in the range from 10.1.0.0 to 10.1.255.255, including the following hosts:

TABLE 1

| Hostname | IP Address |
| --- | --- |
| foo-10-1-0-0.infoblox.com | 10.1.0.0 |
| foo-10-1-0-1.infoblox.com | 10.1.0.1 |
| foo-10-1-0-2.infoblox.com | 10.1.0.2 |
| foo-10-1-0-3.infoblox.com | 10.1.0.3 |

Bulk host 102 also may include data for hosts from 10.1.0.4 to 10.1.255.255, which are not shown in Table 1 for purposes of example.

When bulk host 102 is inserted into index 100, edge 104 and edge 106 are inserted into index 100. Edge 104 is associated with IP address 10.1.0.0 and includes begin marker 108, a reference to bulk host 102. A begin marker (B) marks the beginning of an address range. In other words, it is the lowest IP address in a particular range. Edge 106 is associated with IP address 10.1.255.255 and includes end marker 110, a reference to bulk host 102. An end marker (E) marks the end edge of an address range. In other words, it is the highest IP address in a particular range. As used herein, referencing may be implemented in any appropriate way. For example, edge 104 may include a pointer to bulk host 102 or the OID of bulk host 102 (25.1). In another example, index 112 may include a key for address 116.

Figure 2:
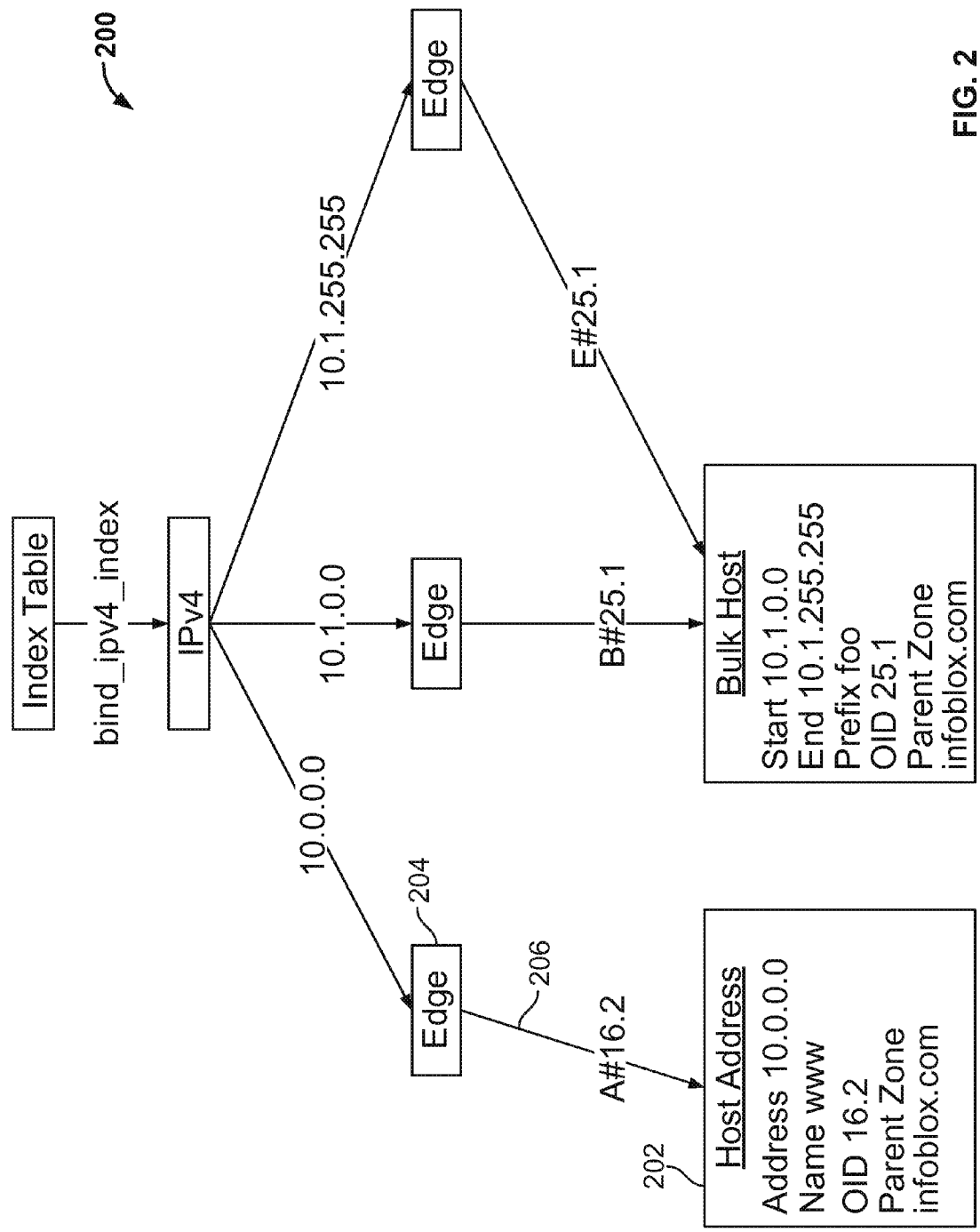
FIG. 2 is a diagram illustrating the insertion of a host address into an index that includes a bulk host.

FIG. 2 is a diagram illustrating the insertion of a host address into an index that includes a bulk host. In this example, host address 202 is inserted in index 100, becoming index 200. A host address (or host or host record) is a record associated with a host. Host address 202 is associated with IP address 10.0.0.0. Host address 202 includes name "www", OID 16.2, and parent zone "infoblox.com". Thus, host address 202 represents host "www.infoblox.com" with IP address 10.0.0.0.

When host address 202 is inserted into index 100, edge 204 is inserted into index 100. Edge 204 is associated with IP address 10.0.0.0 and includes address marker 206, a reference to host address 202. An address marker (A) marks a single address. An address marker may be viewed as a special case of a range where the begin and end addresses are the same.

Figure 3:
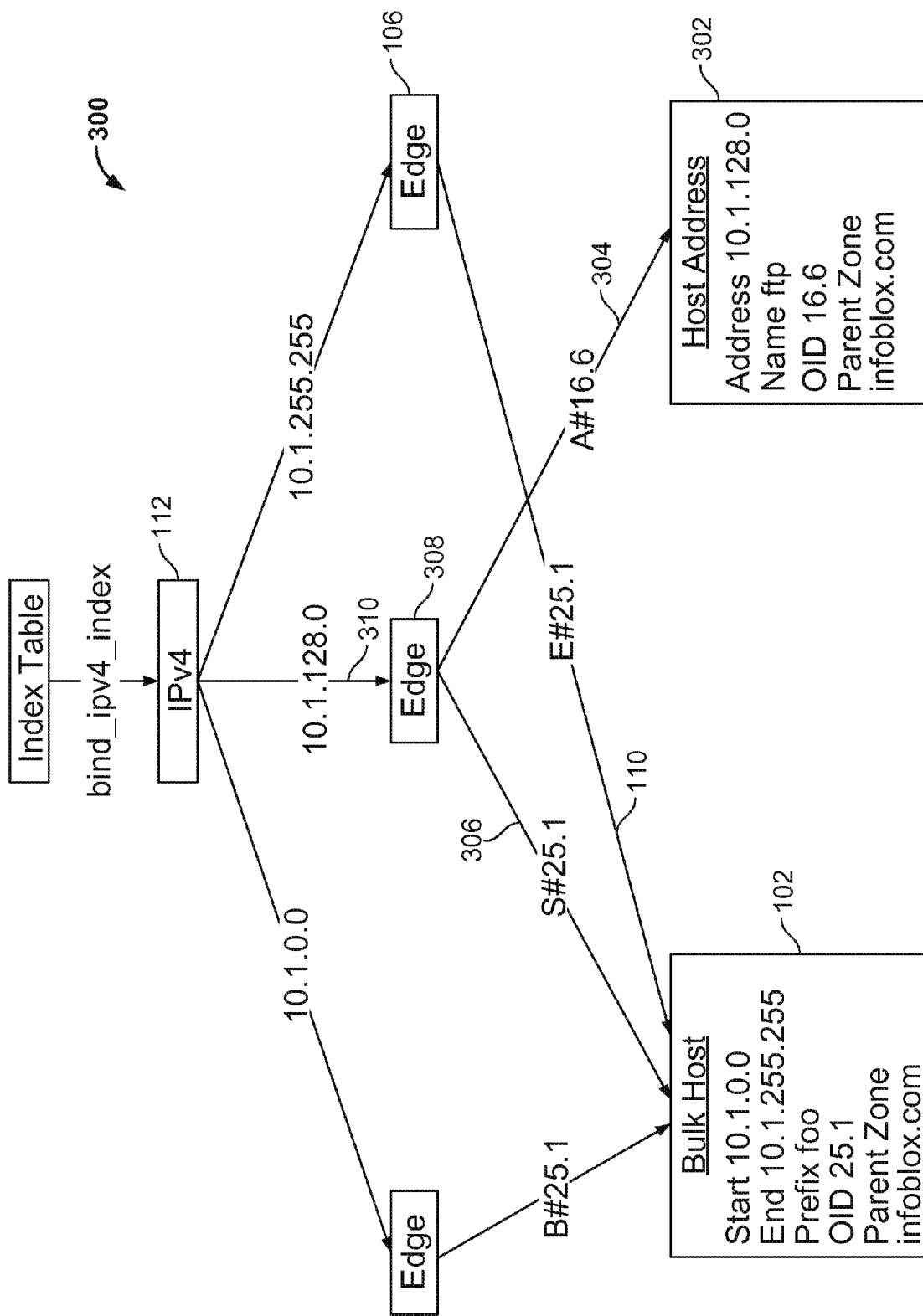
FIG. 3 is a diagram illustrating the insertion of a host address into an index that includes a bulk host.

FIG. 3 is a diagram illustrating the insertion of a host address into an index that includes a bulk host, where the host address falls within an IP address range associated with the bulk host. In this example, host address 302 is inserted in index 100, becoming index 300. Host address 302 is associated with IP address 10.1.128.0. Host address 302 includes name "ftp", OID 16.6, and parent zone "infoblox.com". Thus host address 302 represents host "ftp.infoblox.com" with IP address 10.1.128.0.

When host address 302 is inserted into index 100, edge 308 is inserted into index 100. Index 112 includes reference 310 (10.1.128.0) to edge 308. Edge 308 includes address marker 304 and split marker 306. Address marker 304 is a reference to host address 302. Split marker 306 is a reference to bulk host 102. A split (S) marker marks a split of a range. A range is split when another IP address or edge is inserted between two existing edges. As shown, edge 308 includes split marker 306 to bulk host 102 because IP address 10.1.128.0 splits (the address range associated with) bulk host 102. As used herein, an IP address "splits" a bulk host when the IP address splits the IP address range associated with the bulk host. In other words, 10.1.128.0 falls within the range of bulk host 102 (10.1.0.0 to 10.1.255.255). From edge 308, it can be determined that IP address 10.1.128.0 splits bulk host 102 and corresponds to host address 302.

Figure 4:
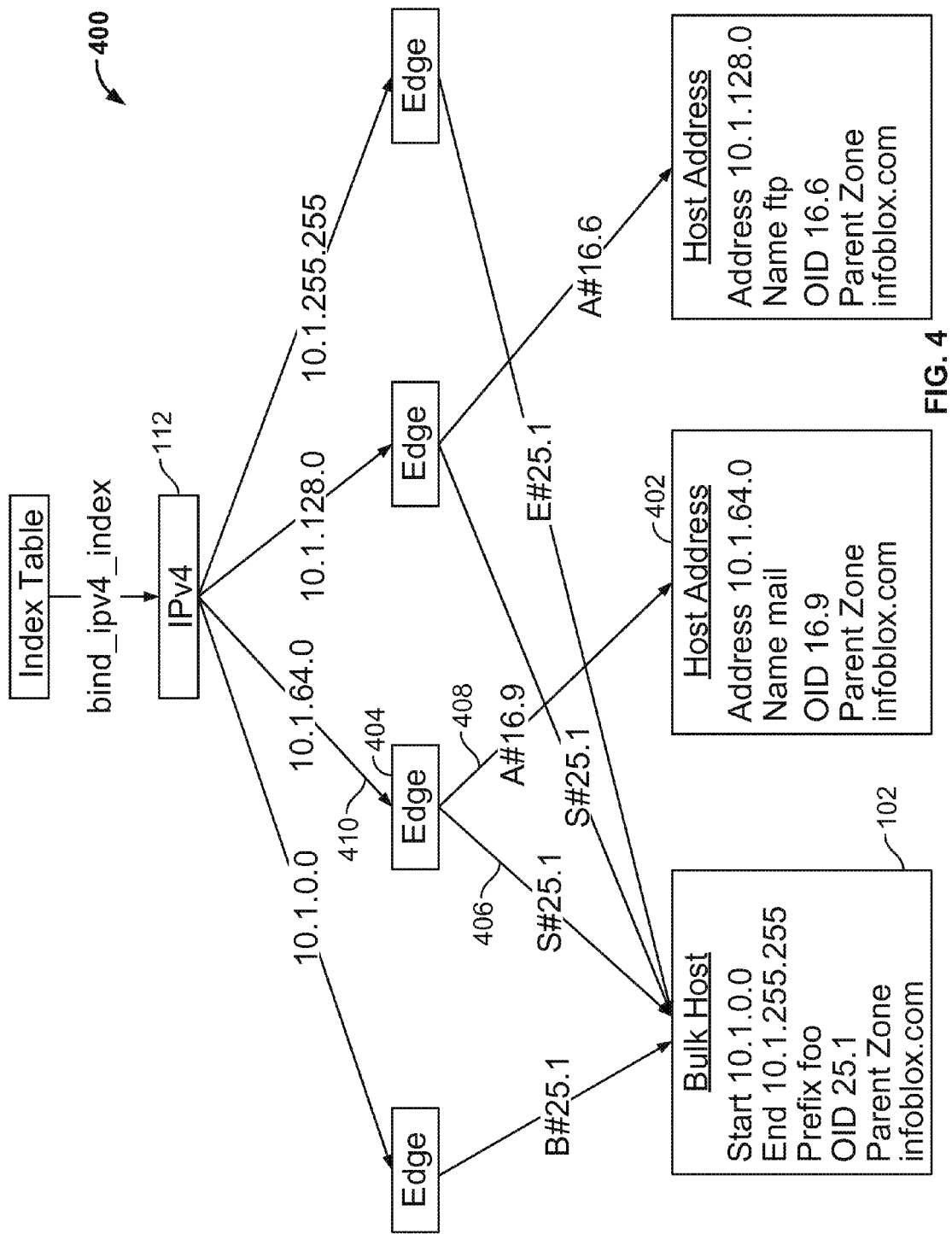
FIG. 4 is a diagram illustrating the insertion of a host address into an index that includes a bulk host and a host address.

FIG. 4 is a diagram illustrating the insertion of a host address into an index that includes a bulk host and a host address. In this example, host address 402 is inserted in index 300, becoming index 400. Host address 402 is associated with IP address 10.1.64.0. Host address 402 includes name "mail", OID 16.9, and parent zone "infoblox.com". Thus host address 402 represents host "mail.infoblox.com" with IP address 10.1.64.0.

When host address 402 is inserted into index 300, edge 404 is inserted into index 300. Index 112 includes reference 410 (10.1.64.0) to edge 404. Edge 404 includes address marker 408 and split marker 406. Address marker 408 is a reference to host address 402. Split marker 406 is a reference to bulk host 102. As shown, edge 404 includes split marker 406 to bulk host 102 because IP address 10.1.64.0 splits bulk host 102.

Figure 5:
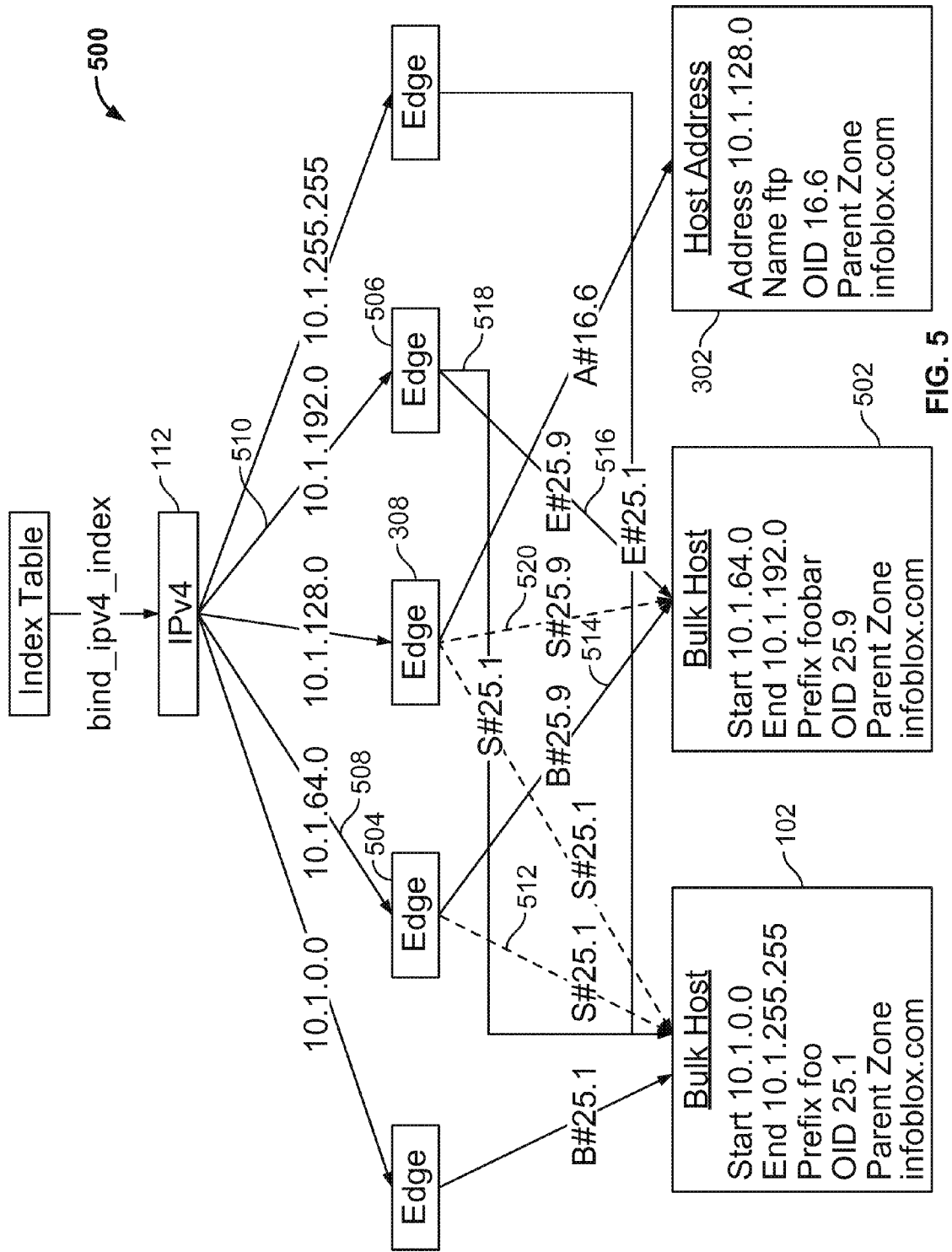
FIG. 5 is a diagram illustrating the insertion of a bulk host into an index that includes a bulk host and a host address.

FIG. 5 is a diagram illustrating the insertion of a bulk host into an index that includes a bulk host and a host address. In this example, bulk host 502 is inserted in index 300, becoming index 500. Bulk host 502 is associated with an IP address range from 10.1.64.0 to 10.1.192.0. Bulk host 502 includes a prefix "foobar" that may be used to generate a host name for each IP address. Bulk host 502 has OID 25.9 and parent "infoblox.com". Thus, bulk host 502 represents a range of hosts with IP addresses in the range from 10.1.64.0 to 10.1.192.0, including the following hosts:

TABLE 2

| Hostname | IP Address |
| --- | --- |
| foobar-10-1-64-0.infoblox.com | 10.1.64.0 |
| foobar-10-1-64-1.infoblox.com | 10.1.64.1 |
| foobar-10-1-64-2.infoblox.com | 10.1.64.2 |
| foobar-10-1-64-3.infoblox.com | 10.1.64.3 |

Bulk host 502 also includes data for hosts from 10.1.64.4 to 10.1.192.0, which are not shown in Table 2 for purposes of example.

When bulk host 502 is inserted in index 300, edges 504 and 506 are inserted into index 300. Index 112 includes reference 508 (10.1.64.0) to edge 504 and reference 510 (10.1.192.0) to edge 506. Edge 504 includes a split marker to bulk host 102 because 10.1.64.0 splits bulk host 102. Edge 504 also includes a begin marker to bulk host 502 because 10.1.64.0 is the begin address of bulk host 502. Edge 308 includes a split marker to bulk host 102 because 10.1.128.0 splits bulk host 102. Edge 308 also includes a split marker to bulk host 502 because 10.1.128.0 splits bulk host 502. Edge 308 also includes an address marker to host address 302 because 10.1.128.0 is the IP address of host address 302. Edge 506 includes a split marker to bulk host 102 because 10.1.192.0 splits bulk host 102. Edge 506 also includes an end marker to bulk host 502 because 10.1.192.0 is the end address of bulk host 502. Using an index such as indexes 100, 200, 300, 400, or 500, queries for addresses, ranges, and intersections can be processed, as more fully described below.

A host may be associated with multiple addresses. Thus there may be multiple edges referencing an object such as a host address or bulk host.

Figure 6:
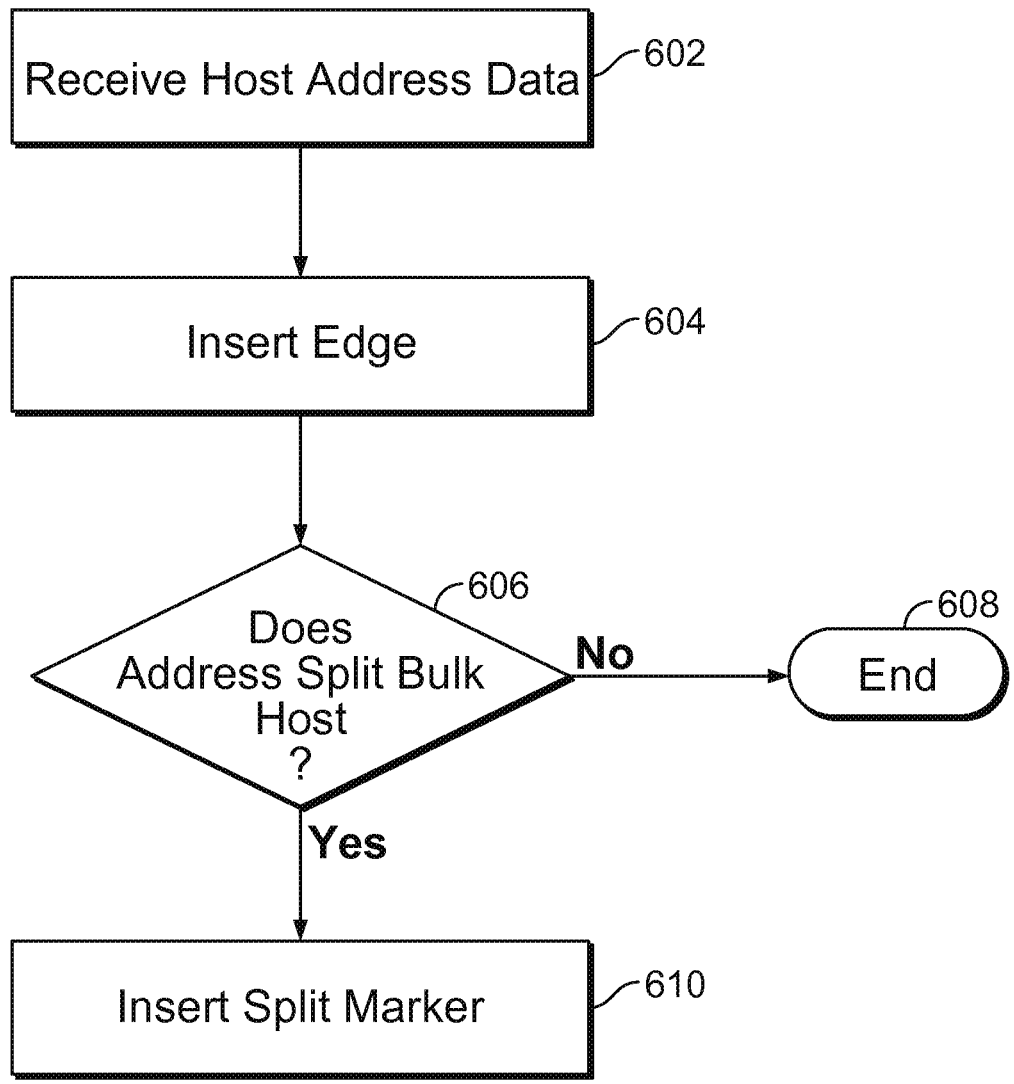
FIG. 6 is a flowchart illustrating an embodiment of a process for inserting a host address into an index.

FIG. 6 is a flowchart illustrating an embodiment of a process for inserting a host address into an index. This process may be used to insert a host address, such as host address 202, 302, or 402, into an index.

At 602, host address data is received. For example, an IP address, name, and parent zone for a host address are received. At 604, an edge is inserted into the index. The edge corresponds to the IP address of the host address to be inserted. Inserting the edge includes adding a reference to the edge and adding a reference to the host address. For example, when inserting edge 308 in FIG. 3, references 310 and 304 are added. At 606, it is determined whether the IP address splits a bulk host. If the IP address does not split a bulk host, the process ends at 608. If the IP address does split a bulk host, a split marker to the bulk host is inserted at 610. A split marker is inserted from the edge corresponding to the host address to the bulk host. For example, in FIG. 3, when inserting host address 302, it is determined that IP address 10.1.128.0 splits bulk host 102. Therefore, split marker 306 is inserted.

Figure 7:
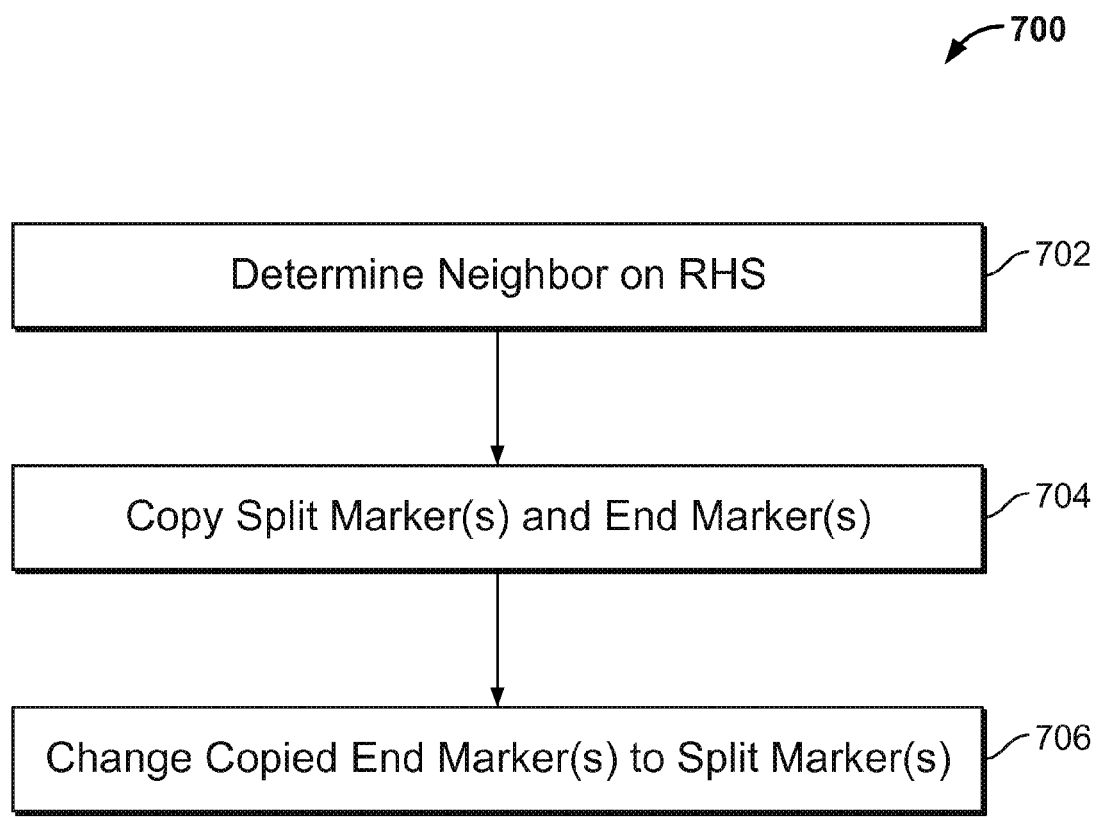
FIG. 7 is a flowchart illustrating an embodiment of a process for inserting split marker(s).

FIG. 7 is a flowchart illustrating an embodiment of a process for inserting split marker(s). In some embodiments, process 700 is performed following the insertion of an edge at 604. At 702, a neighboring edge on the right hand side is determined. For example, when edge 308 is inserted in FIG. 3, the neighbor on the right hand side is edge 106. At 704, split marker(s) and end marker(s) of the neighbor are copied to the inserted edge. For example, when edge 308 is inserted, its neighbor (edge 106) has one end marker, end marker 110. End marker 110 is copied to edge 308. Stated another way, edge 308 now includes an end marker (reference) to bulk host 102 (i.e., marker 306, only as an end marker). At 706, the copied end marker(s) are changed to split marker(s). For example, when edge 308 is inserted, the end marker to bulk host 102 is changed to a split marker (split marker 306).

Figure 8:
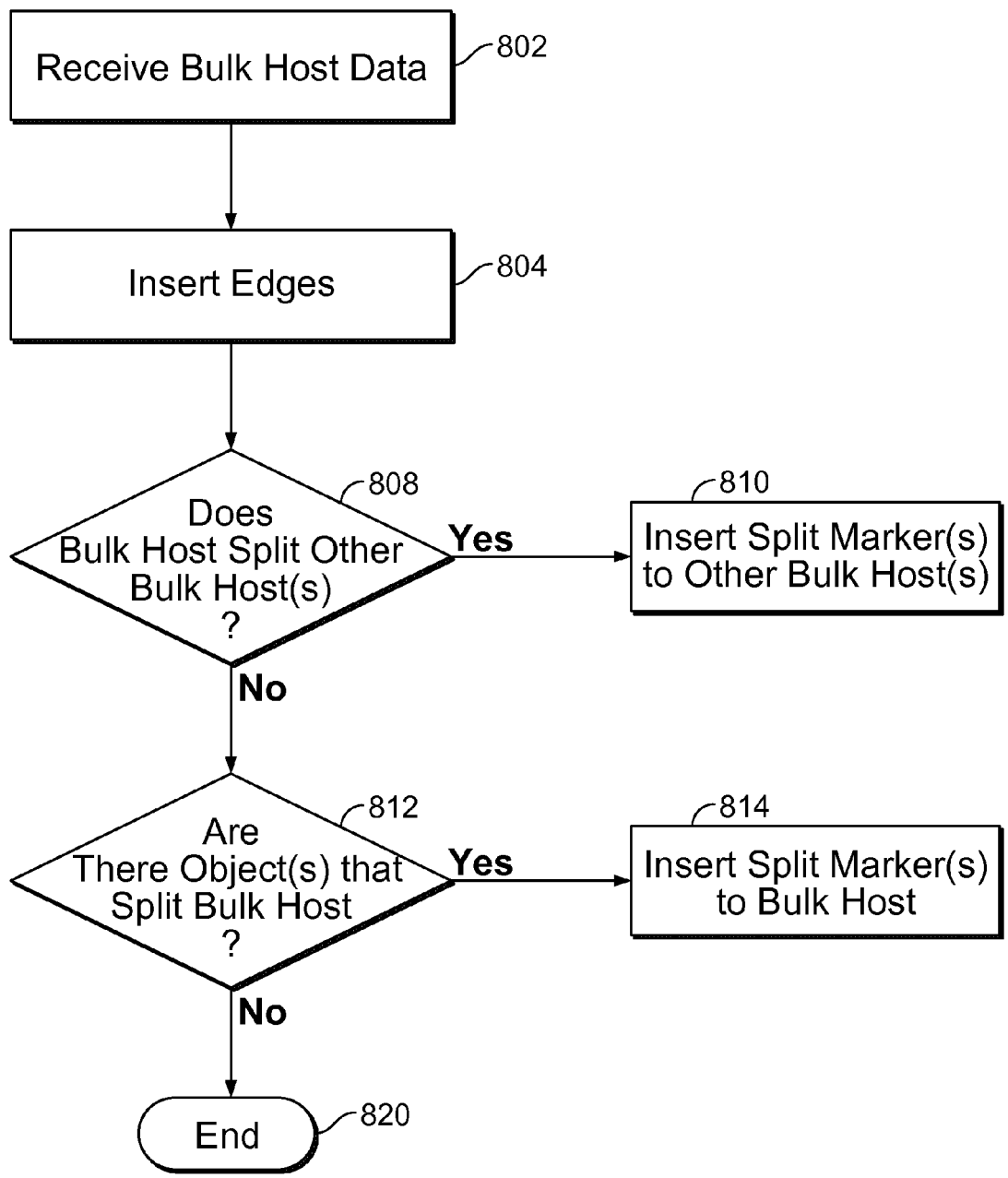
FIG. 8 is a flowchart illustrating an embodiment of a process for inserting a bulk host into an index.

FIG. 8 is a flowchart illustrating an embodiment of a process for inserting a bulk host into an index. This process may be used to insert a bulk host, such as bulk host 102 or 502, into an index.

At 802, bulk host data is received. For example, a range of IP addresses (e.g., a start IP address and an end IP address), a prefix, and a parent zone are received. At 804, edges are inserted into the index. The edges include an edge corresponding to the start IP address and an edge corresponding to the end IP address. In some cases, one or both edges may already exist and do not need to be inserted. Inserting an edge includes adding a reference to the edge and adding a reference to the bulk host. For example, in FIG. 5, when bulk host 502 is inserted, edges 504 and 506 are inserted. References 508 and 514 are added for edge 504, and references 510 and 516 are added for edge 506.

At 808, it is determined whether the bulk host splits other bulk host(s). If the bulk host splits other bulk host(s), split marker(s) to the split bulk host(s) are inserted at 810. A split marker is inserted from the edge corresponding to the start IP address of the bulk host to the split bulk host, and a split marker is inserted from the edge corresponding to the end IP address of the bulk host to the split bulk host. For example, in FIG. 5, when bulk host 502 is inserted, it is determined that bulk host 502 splits bulk host 102. Therefore, split markers 512 and 518 are inserted. In some embodiments, performing 808 and 810 comprises performing process 700 for each inserted edge (e.g., edges 504 and 506).

If the bulk host does not split other bulk host(s), then at 812, it is determined whether there are object(s) that split the bulk host. An object includes a host address or bulk host. If there are no object(s) that split the bulk host, then the process ends at 820. If there are object(s) that split the bulk host, then at 814, split marker(s) to the bulk host are inserted. In the case where the object is a host address, a split marker is inserted from the edge corresponding to the object to the bulk host. For example, in FIG. 5, when bulk host 502 is inserted, it is determined that host address 302 splits bulk host 502. Therefore, split marker 520 is inserted from edge 308 to bulk host 502.

In the case where the object is a bulk host, a split marker is inserted from the edge corresponding to the start IP address of the object to the bulk host, and a split marker is inserted from the edge corresponding to the end IP address of the object to the bulk host. For example, in FIG. 5, if bulk host 502 was inserted first, and then bulk host 102 is inserted, it would be determined that bulk host 502 splits bulk host 102. Therefore, split markers 512 and 518 would be inserted. In some embodiments, performing 812 and 814 comprises performing process 700 for each edge between the edge corresponding to the start IP address of the bulk host and the edge corresponding to the end IP address of the bulk host (e.g., each edge between edges 504 and 506, or edge 308).

Figure 9:
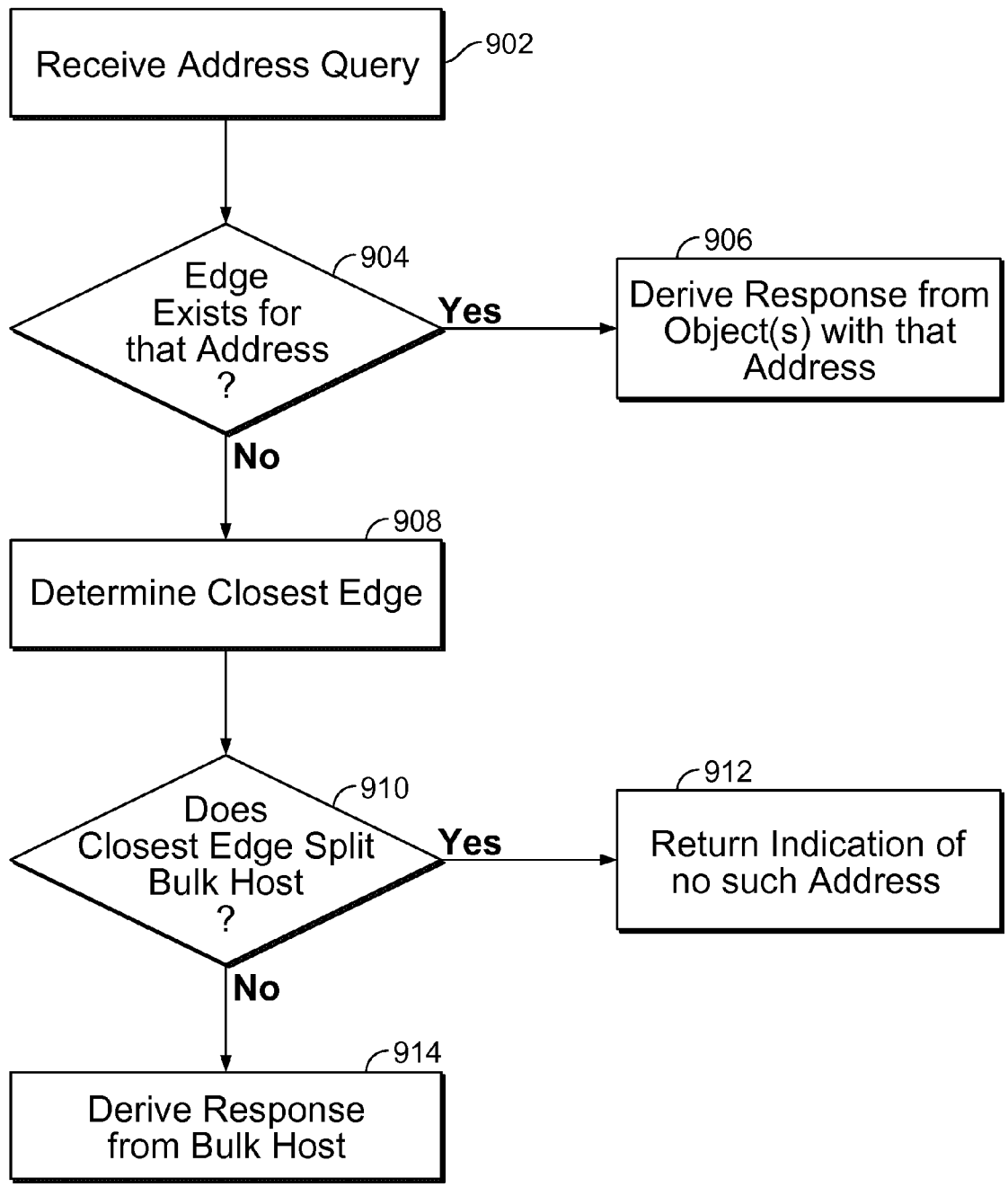
FIG. 9 is a flowchart illustrating an embodiment of performing an address query.

FIG. 9 is a flowchart illustrating an embodiment of performing an address query. This process receives an address query and uses an index, such as index 500, to derive a response to the address query. At 902, an address query is received. For example, a query for a specific IP address is received. At 904, it is determined whether an edge exists for that address. In other words, it is determined whether an edge corresponds to the IP address. If an edge exists, then a response is derived from object(s) with that address at 904. For example, in FIG. 5, if a query for 10.1.128.0 is received, it is determined that edge 308 corresponds to that address. From edge 308, objects with that address include host address 302. A PTR record is derived from host address 302 and returned.

If an edge does not exist for that address, then at 908, the closest edge above the address is determined. Stated another way, the edge corresponding to the IP address that is closest to that address and greater than that address is determined. This may be performed by walking across each edge from left to right (in order of increasing addresses). As soon as an edge address that is greater than the IP address is reached, the walk stops and that edge is determined to be the closest edge. For example, in FIG. 5, if a query for IP address 10.1.64.8 is received, there is no edge corresponding to that address. The closest edge above 10.1.64.8 is edge 308, which corresponds to IP address 10.1.128.0.

At 910, it is determined whether the closest edge (above the address) splits a bulk host. In other words, it is determined whether the IP address corresponding to the closest edge falls in the range of the IP addresses corresponding to a bulk host. This may be performed by determining whether the closest edge includes a split marker. If the closest edge splits multiple bulk hosts, the bulk host with the smallest range is selected. In some embodiments, other rules may be used.

If the closest edge does split a bulk host, than a response is derived from the bulk host at 914. Continuing with the previous example in which the closest edge to 10.1.64.8 is edge 308. Edge 308 splits bulk host 502 and bulk host 102. Bulk host 502 has a smaller range. Therefore, from bulk host 502, a PTR record corresponding to IP address 10.1.64.8 is derived. For example, the PTR record may include host name "10-1-64-8-foobar.infoblox.com".

If the closest edge does not split a bulk host, then an indication that there is no such address is returned at 912. For example, a PTR record corresponding to the closest IP address may be returned, which indicates that a PTR record for the queried IP address does not exist and is not derivable.

As shown, a single bulk host object may be used to simulate a set of records corresponding to a range of addresses. If an address query is received, the appropriate response can be derived from the bulk host object.

In this embodiment, a smaller object (i.e., an object corresponding to a smaller range or number of IP addresses) overrides a larger object (i.e., an object corresponding to a larger range or number of IP addresses). Stated another way, a host address overrides a bulk host, which overrides a larger bulk host. For example, when an address query for 10.1.128.0 is received, the response is derived from host address 302, and not from larger bulk host 502 or from even larger bulk host 102. When an address query for 10.1.64.8 is received, the response is derived from bulk host 502 and not from larger bulk host 102. Overriding may be used to delegate authority, as more fully described below.

Although bulk hosts are described and shown in indexes 100, 200, 300, 400, and 500, the techniques described herein may apply to any ranged object, such as reverse zones. For example, an index may include bulk hosts and/or reverse zones. Multiple indexes may be maintained for various queries that may be expected. For example, an index including bulk hosts and an index including reverse zones may be maintained. Ranged objects may have constraints, such as disjoint or nested. If disjoint, an object's range may not overlap with another object's range. If nested, an object's range must be contained within another object's range.

Figure 10:
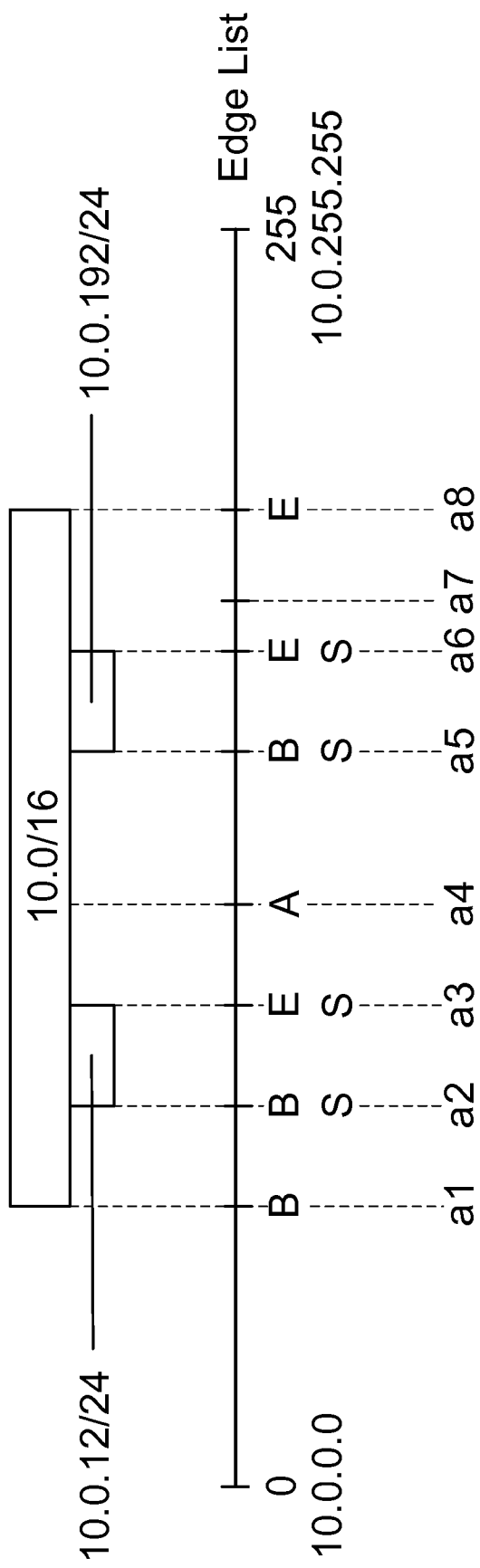
FIG. 10 is a diagram illustrating an example of address delegation.

FIG. 10 is a diagram illustrating an example of address delegation. In this example, IP addresses are shown on a horizontal axis. Reverse zone address ranges are indicated on the axis. As shown, there is a reverse zone for the range 10.0.0.0-10.0.255.255, 10.0/16, 10.0.12/24, and 10.0.192/24 (specified here using Internet Protocol version 4 (IPv4) Classless Inter-Domain Routing (CIDR) syntax).

As marked on the axis, the reverse zone corresponding to 10.0/16 has begin (B) address a1 and end (E) address a8. The reverse zone 10.0.12/24 has begin address a2 and end address a3. The reverse zone 10.0.192/24 has begin address a5 and end address a6. A host address (A) is also marked at address a4. Thus, in an index such as index 500, the edges would include addresses 0, a1-a8, and 10.0.255.255.

In this example, addresses may be overridden or delegated to an authority. For example, the reverse zone 10.0.12/24 and a4 may override 10.0/16. 10.0.192/24 may be delegated to another authority. An address or set of addresses may be delegated in order to give another server authority for those address(es). For example, the reverse zone 10.0.192 may be served by a remote server located in Tokyo.

In another example, the reverse zone corresponding to 10.0/16 may be delegated to another authority. Within that range, reverse zones corresponding to 10.0.12/24 and 10.0.192/24 and host address a4 may be delegated to the same or other authorities.

Figure 11:
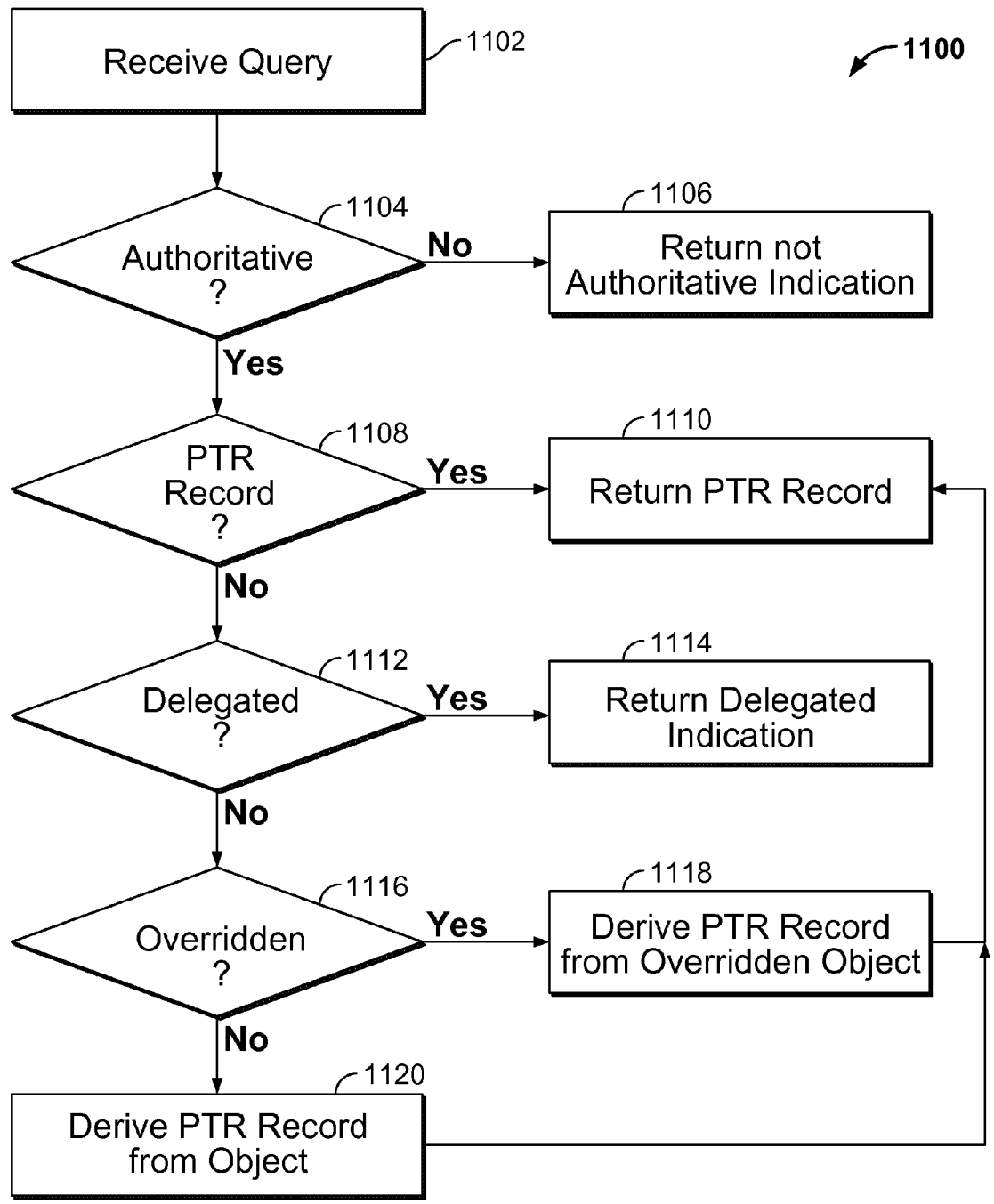
FIG. 11 is a flowchart illustrating an embodiment of performing an address query when one or more addresses are delegated.

FIG. 11 is a flowchart illustrating an embodiment of performing an address query when one or more addresses are delegated. For example, this process may be performed at a DNS server. A query is received at 1102. The query includes an IP address. At 1104, it is determined whether the DNS server is authoritative for the IP address. If the DNS server is not authoritative for the IP address, then an indication that the DNS server is not authoritative for the IP address is received at 1106. If the DNS server is authoritative for the IP address, then it is determined whether there is a PTR record for the IP address at 1108. If there is a PTR record, then the PTR record is returned at 1110. In some embodiments, it is determined whether a PTR record can be derived (for example, from a host address) at 1108, and if so, then a PTR record is derived and returned at 1110.

If there is not a PTR record for the IP address, then it is determined whether the IP address is delegated at 1112. If the IP address is delegated, then at 1114, a delegated indication is returned. The request may be forwarded to a server that has authority for the IP address. At that server, process 1100 may be started again. In this way, multiple DNS servers may begin process 1100 to resolve an IP address.

If the address is not delegated, then it is determined whether the address is overridden at 1116. For example, in FIG. 5, host address 302 overrides reverse zone 502, which overrides reverse zone 102. If the address is overridden, then a PTR record is derived from an overriding object, such as a host address or bulk host, at 1118 and the PTR record is returned at 1118.

If the address is not overridden, then a PTR record is derived from an object, such as a host address or bulk host, at 1120 and the PTR record is returned at 1110.

Figure 12:
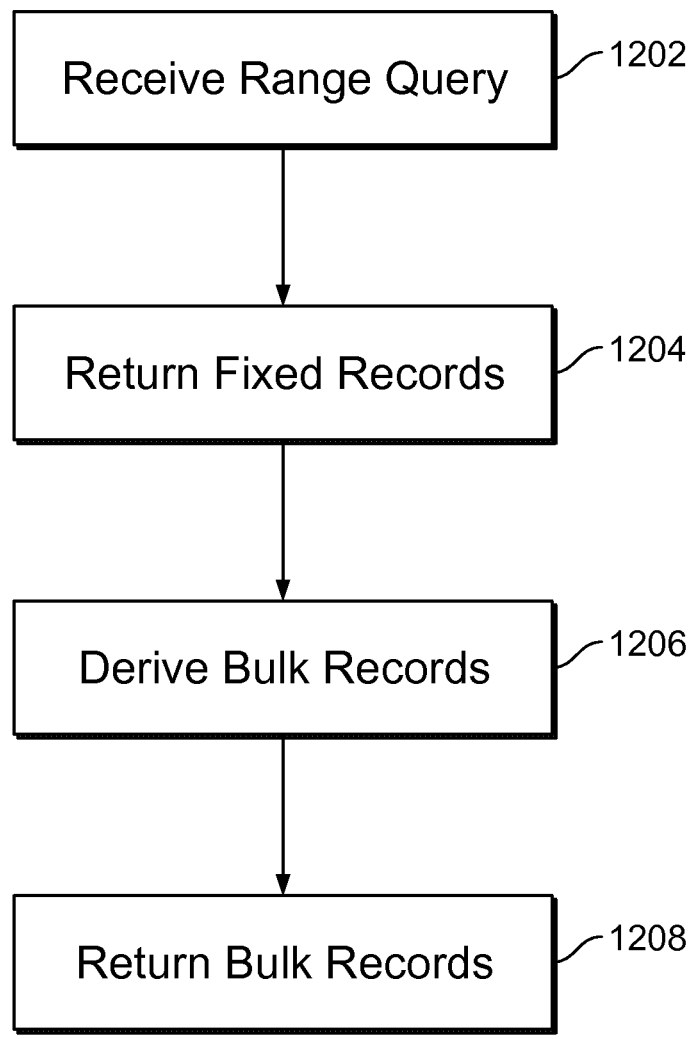
FIG. 12 is a flowchart illustrating an example of performing a range query.

FIG. 12 is a flowchart illustrating an example of performing a range query. A range query includes a range of IP addresses. For example, given a set of ranges R and a range r, a range query returns the subset of ranges in R that overlaps with r. The ranges in R may overlap with each other. Also, a single address may be considered a special case of a range where the begin and end addresses are the same. A range query may be used to perform a zone transfer. For example, objects associated with a range of addresses may be transferred to another authority. The objects may include PTR records, host address records, name server (NS) records, mail exchange (MX) records, etc.

At 1202, a range query is received. For example, the range query may include the range of IP addresses a1-a6. At 1204, fixed records are returned. Fixed records include records that correspond to a single IP address, such as a host address. For example, in FIG. 10, if the range query includes IP addresses a1-a6, one fixed record, at IP address a4, is returned. At 1206, bulk records are derived. Bulk records (sometimes referred to herein as bulk objects) include records (objects) that correspond to multiple IP addresses, such as a bulk host or reverse zone. At 1208, bulk records are returned. For example, in FIG. 10, if the range query includes IP addresses a1-a6, two bulk records are returned: the bulk record between a2 and a3 and the bulk record between a5 and a6. One or more of the fixed records and bulk records may be delegated, in which case, one or more delegated indications are returned. The request may be forwarded to another server (or other entity) with authority for the delegated address(es) as described above.

Figure 13:
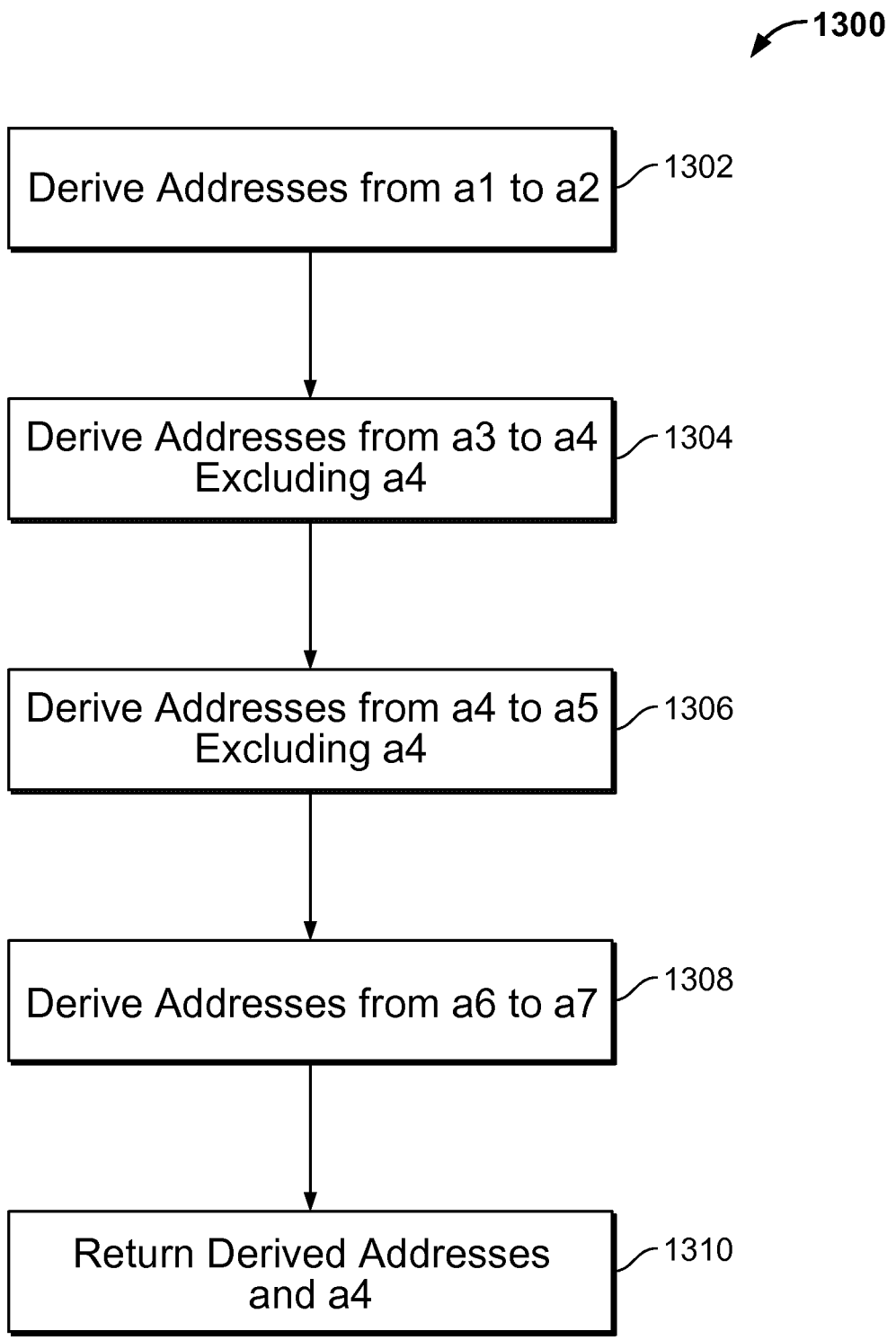
FIG. 13 is a flowchart illustrating an embodiment of performing a range query based at least in part on an index.

FIG. 13 is a flowchart illustrating an embodiment of performing a range query based at least in part on an index. In this example, it is shown that a range query may be processed by walking across edges from left to right (or in order of increasing addresses). For example, a range query is received for addresses a1-a7 in FIG. 10. In this example, address a4 and bulk host 10.0.12/24 override bulk host 10.0/16. Addresses 10.0.192/24 are delegated to another authority (for example, another DNS server).

At 1302, addresses from a1 to a2 are derived. The addresses are derived from bulk host 10.0/16, in a manner as described above. At 1304, addresses from a3 to a4, excluding a4, are derived. Here the addresses are derived from bulk host 1.0.12/24. Address a4 is not derived because it is overridden. At 1306, addresses from a4 to a5, excluding a4 are derived. The addresses are derived from bulk host 10.0/16. Addresses are not derived for a5 to a6 because this range of addresses is delegated. At 1308, addresses from a6 to a7 are derived. The addresses are derived from bulk host 10.0/16. At 1310, the derived addresses and a4 are returned. In some embodiments, for addresses that are delegated, the request is forwarded to the appropriate authority as described above.

As described, process 1300 is performed by walking across the addresses in increasing order. For each marker, it is determined whether the address is overridden or delegated. If the address is not overridden or delegated, a response is derived. A similar process may be used to respond to intersection queries.

An index may be used when performing processes such as determining which bulk hosts overlap with a given address, determining if a given DHCP range overlaps with any other DHCP range, and/or finding all objects that are associated with a given IP address.

As described herein, large numbers of records, such as PTR records or A records, can be derived from a bulk record. This circumvents the need to create a record for each PTR record or A record. Having to create a record for each PTR record or A record for a large number of records can hang up the system in some cases. In addition, each derived A record or PTR record may be meaningful; that is, each may represent an actual A record or PTR record in a name space that is being managed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of storing data, comprising:
receiving a first network address, wherein the first network address corresponds to a plurality of contiguous network addresses;
receiving a range of network addresses, wherein the range of network addresses is associated with Domain Name System (DNS);
storing using a processor the range of network addresses as a first bulk object in a database for storing information associated with the range of network addresses, wherein the first bulk object is a bulk record associated with multiple hosts in a range of network addresses, wherein the range of network addresses includes a contiguous set of addresses bounded by an inclusive begin address and an inclusive end address, and wherein an index is used to access objects stored in the database; and
storing using the processor the first network address as a second bulk object in the database, the second bulk object being another bulk record and different from the first bulk object;
wherein storing includes:
inserting an edge associated with the begin address of the range of network addresses into the index, the edge including a begin marker for the range of network addresses and a reference to the first bulk object;
inserting an edge associated with the end address of the range of network addresses into the index, the edge including an end marker for the range of network addresses and a reference to the first bulk object; and
determining whether the first network address is located between the begin address and the end address;
in the event that each network address of the first network address is located between the begin address and the end address:
inserting an edge associated with the first network address into the index, the edge including an address marker and a split marker, wherein the address marker is a reference to the second bulk object, and wherein the split marker is a reference to the first bulk object; and
in the event that each network address of the first network address is located outside the begin address and the end address:
inserting the first network address into the index;
wherein the first and second bulk objects are reverse zone records and are associated with a constraint, the constraint being disjointed or nested;
wherein in the event that the first and second bulk objects are disjointed, the range of network addresses of the first bulk object does not overlap with a range of network addresses of the second bulk object; and
wherein in the event that the first and second bulk objects are nested, the range of network addresses of the first bulk object overlaps with the range of network addresses of the second bulk object.

2. The method as recited in claim 1, wherein the ranges of network addresses the first and second bulk objects include ranges of Internet Protocol (IP) addresses.

3. The method as recited in claim 1, wherein a split marker marks where another network address or edge is inserted between two existing edges.

4. A system for storing data, comprising:
a processor configured to:
receive a first network address, wherein the first network address corresponds to a plurality of contiguous network addresses;
receive a range of network addresses, wherein the range of network addresses is associated with Domain Name System (DNS);
store using a processor the range of network addresses as a first bulk object in a database for storing information associated with the range of network addresses, wherein the first bulk object is a bulk record associated with multiple hosts in a range of network addresses, wherein the range of network addresses includes a contiguous set of addresses bounded by an inclusive begin address and an inclusive end address, and wherein an index is used to access objects stored in the database; and store using the processor the first network address as a second bulk object in the database, the second bulk object being another bulk record and different from the first bulk object;

wherein storing includes:

inserting an edge associated with the begin address of the range of network addresses into the index, the edge including a begin marker for the range of network addresses and a reference to the first bulk object;

inserting an edge associated with the end address of the range of network addresses into the index, the edge including an end marker for the range of network addresses and a reference to the first bulk object;

determining whether the first network address is located between the begin address and the end address;

in the event that each network address of the first network address is located between the begin address and the end address:

inserting an edge associated with the first network address into the index, the edge including an address marker and a split marker, wherein the address marker is a reference to the second bulk object and wherein the split marker is a reference to the first bulk object; and in the event that each network address of the first network address is located outside the begin address and the end address:

inserting the first network address into the index;

wherein the first and second bulk objects are reverse zone records and are associated with a constraint, the constraint being disjointed or nested;

wherein in the event that the first and second bulk objects are disjointed, the range of network addresses of the first bulk object does not overlap with a range of network addresses of the second bulk object; and wherein in the event that the first and second bulk objects are nested, the range of network addresses of the first bulk object overlaps with the range of network addresses of the second bulk object; and a memory coupled with the processor, wherein the memory provides the processor with instructions.

5. The system as recited in claim 4, wherein a split marker marks where another network address or edge is inserted between two existing edges.

6. A computer program product for storing data, the computer program product being embodied in a non-transitory computer readable storage medium and comprising computer instructions for:

receiving a first network address, wherein the first network address corresponds to a plurality of contiguous network addresses;

receiving a range of network addresses, wherein the range of network addresses is associated with Domain Name System (DNS);

storing using a processor the range of network addresses as a first bulk object in a database for storing information associated with the range of network addresses, wherein the first bulk object is a bulk record associated with multiple hosts in a range of network addresses, wherein the range of network addresses includes a contiguous set of addresses bounded by an inclusive begin address and an inclusive end address, and wherein an index is used to access objects stored in the database; and storing using a processor the first network address as a second bulk object in the database, the second bulk object being another bulk record and different from the first bulk object;

wherein storing includes:

inserting an edge associated with the begin address of the range of network addresses into the index, the edge including a begin marker for the range of network addresses and a reference to the first bulk object;

inserting an edge associated with the end address of the range of network addresses into the index, the edge including an end marker for the range of network addresses and a reference to the first bulk object;

determining whether the first network address is located between the begin address and the end address;

in the event that each network address of the first network address is located between the begin address and the end address:

inserting an edge associated with the first network address into the index, the edge including an address marker and a split marker, wherein the address marker is a reference to the second bulk object and wherein the split marker is a reference to the first bulk object; and in the event that each network address of the first network address is located outside the begin address and the end address:

inserting the first network address into the index;

wherein the first and second bulk objects are reverse zone records and are associated with a constraint, the constraint being disjointed or nested;

wherein in the event that the first and second bulk objects are disjointed, the range of network addresses of the first bulk object does not overlap with a range of network addresses of the second bulk object; and wherein in the event that the first and second bulk objects are nested, the range of network addresses of the first bulk object overlaps with the range of network addresses of the second bulk object.

7. The computer program product as recited in claim 6, wherein a split marker marks where another network address or edge is inserted between two existing edges.

* * * * *